Nov. 3, 1942.                H. G. KAMRATH                 2,301,120
                             SCREEN OIL FILTER
                           Filed Jan. 12, 1940              2 Sheets—Sheet 1
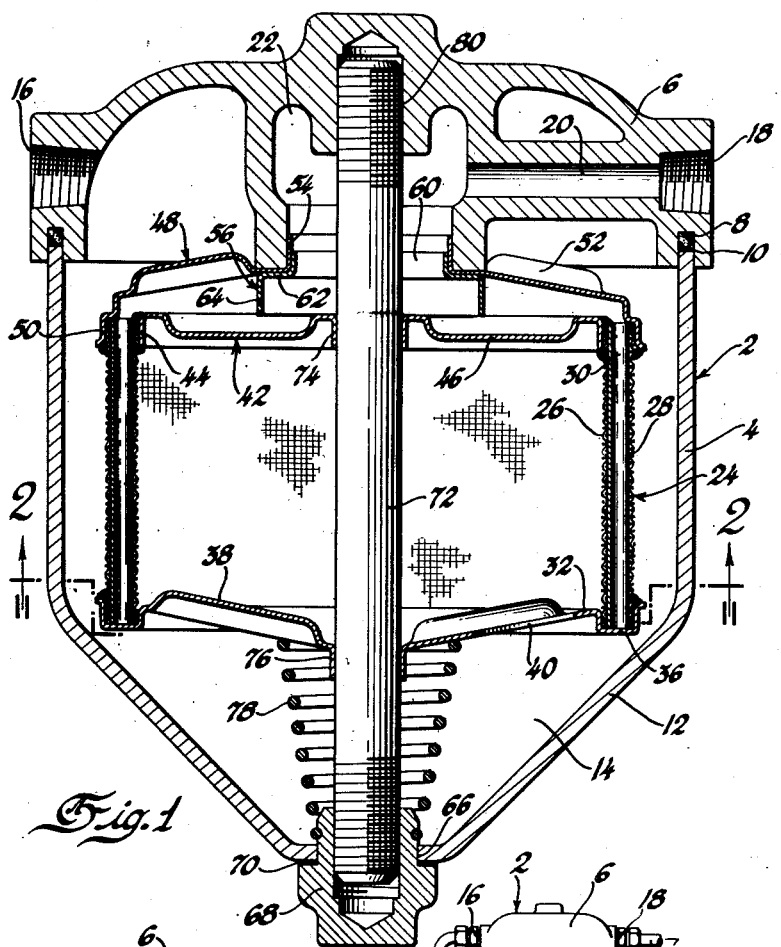
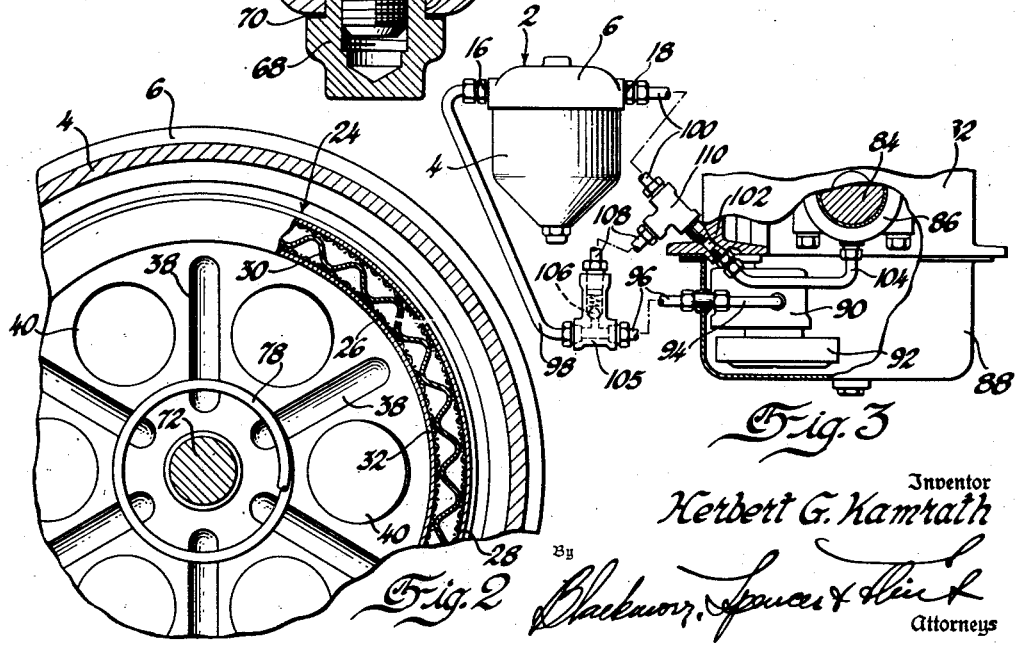
Inventor
Herbert G. Kamrath
By Blackmore, Spencer & Flint
Attorneys Patented Nov. 3, 1942

2,301,120

UNITED STATES PATENT OFFICE 2,301,120

SCREEN OIL FILTER

Herbert G. Kamrath, Flint, Mich., assignor to General Motors Corporation, Detroit, Mich., a corporation of Delaware Application January 12, 1940, Serial No. 313,555

8 Claims. (Cl. 210—183)

This invention relates to oil filters and has particular reference to a filter adapted for installation in the lubricating system of an internal combustion engine used on automotive vehicles.

The essential novelty of the invention resides in placing in a housing two concentric screens spaced apart by a corrugated or fluted element. The space between the screens is entirely closed at one end so that the lubricant may reach the outside of the outer screen and the inside of the inner screen. At the other end of the screens the inner screen is closed by a plate rigidly secured to the inside of the edge of the inner screen. The outer screen has another closure plate rigidly secured thereto at the screen edge and this plate has its upper middle part connected to an outlet in a cap which closes the housing. The oil enters through an inlet in the cap, passes through the two screens into the space therebetween, and then flows into the space between the two closure plates, and then to the outlet opening in the cap.

On the drawings—

Figure 1 is a sectional view through the filter.

Figure 2 is a section on the line 2—2 of Figure 1.

Figure 3 is a more or less schematic view of the application of the filter to an engine.

Figure 4:
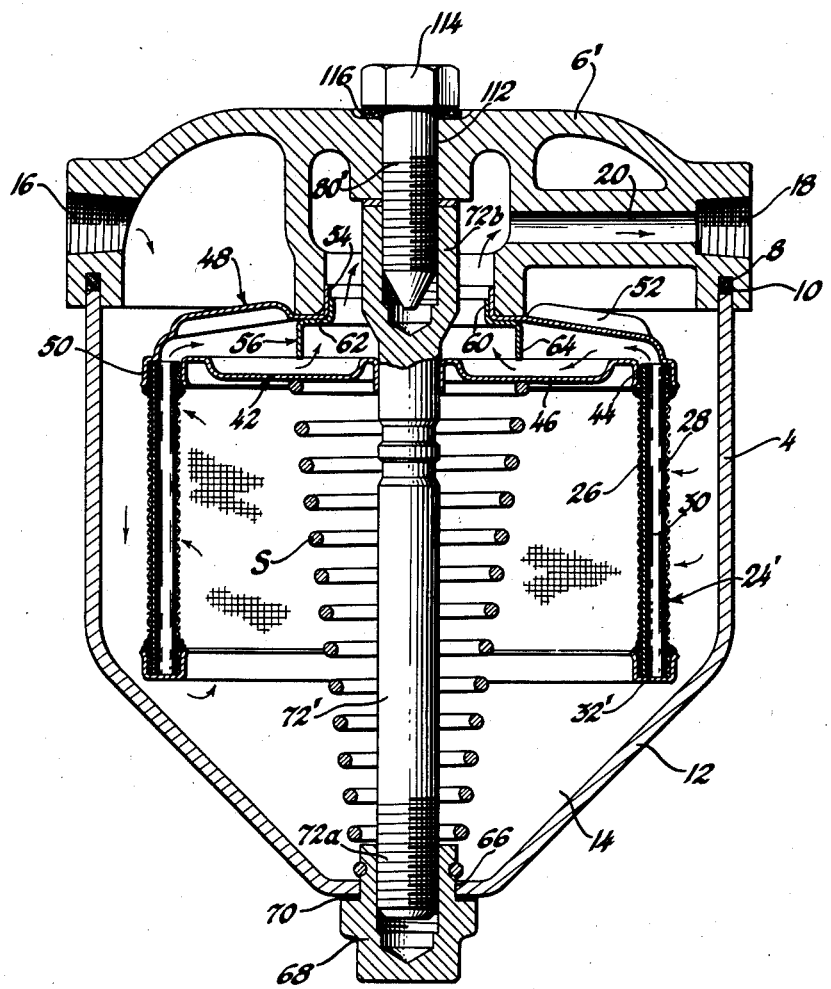
Figure 4 is a sectional view through a modified form of filter, the section being similar to that shown in Figure 1.

Referring to the drawings, the numeral 2 indicates the filter as a whole. The filter has the lower housing 4 and the upper closure or cap 6. The cap has a peripheral groove 8 on which a suitable gasket 10 is placed and into the groove there fits the rim of the housing 4. The lower end 12 of the housing is of conical shape to form a sump 14.

The cap 6 is preferably made of cast metal and has the oil inlet 16, the oil outlet 18, and the outlet passage 20. The outlet passage communicates with a central hollowed out chamber 22 which receives the filtered oil from the filter.

The filter as a whole is indicated at 24 and comprises an inner cylindrical screen 26 and an outer cylindrical screen 28. The two screens are coaxial and are spaced from each other by a cylindrical, corrugated, or fluted member 30. The member 30 is corrugated to give it additional strength and to prevent the pressure of the oil from collapsing the screens against each other.

At the lower ends of the screens 26 and 28 a retaining member 32 is applied. This retaining member has the annular peripheral groove 36 in which the lower ends of the two screens 26 and 28 and the spacer 30 are received. The ends of screens 26 and 28 are soldered to the sides of the groove 36 to make a liquid tight connection.

The plate 32 is provided with the reinforcing ribs 38 and the openings 40. The openings 40 are for the purpose of allowing unfiltered oil to reach the inner screen 26.

The upper ends of the screens 26 and 28 are open, but the inside of the inner screen 26 is closed by a retaining plate 42 which has an edge flange 44 which is soldered to the upper edge of the screen 26. This plate 42 has the ribs 46 to give it additional strength.

A third reinforcing plate 48 has the edge flange 50 which closely fits over the outer edge of the outer screen. The flange 50 is suitably soldered to the screen in liquid tight relation and suitable strengthening ribs 52 are formed in the upper retaining plate to give it additional strength.

The plate 48 is provided with an outlet or neck 54 which snugly fits into the inside of the chamber 22 to enable oil from the filter to pass to the outlet 18.

If desired, a strengthening element 56 may be provided inside the retaining plate 48 and between the plates 42 and 48. This strengthening element has a neck 60 which closely fits inside the neck 54 of the retaining plate 48. A flange 62 is also provided which closely fits on the underside of the retaining plate 48. A downwardly extending annular rim 64 extends as far as the retaining member 42 and is in contact therewith. If desired, this ring may be formed into a plurality of fingers.

The bottom of the sump 12 has an opening 66 in which there is received the end stud 68. A gasket 70 is positioned between the stud and bottom of the sump 12. The stud is interiorly threaded to receive the threaded end of a bolt 72. This bolt 72 passes through the neck 54 in the retaining plate 48; through a flanged opening 74 in the plate 46; and through a flanged opening 76 in the lower retaining plate 32; and has its end screwed into the threads on the interior of the stud 68. The fit between the bolt 72 and the flange 74 is liquid tight. A cone-shaped coil spring 78 is positioned between the stud 68 and the retaining plate 32 and presses the two apart so that there is the constant tendency to force the plate 48 against the edge of the chamber 22 as is best shown in Figure 1.

The filtering unit 24 is constructed as an entirety and to secure the parts together the bolt 72 is first threaded into the threaded opening 80 in the cap 6. The filtering unit 24 is then applied, the coil spring 78 placed over the bolt 72, and the housing 2 then applied over the assembled parts. The parts are then rigidly held in the position shown in Figure 1 by then screwing on and tightening the stud 68.

In its operation, the oil to be filtered will enter at the entrance 16 and pass into the space around the outer screen 24 and also through the openings 40 into the space at the inside of the inner screen 26. The connection at 74 between the bolt 72 and the retaining plate 42 is a very tight one and will not permit lubricant to pass therethrough. The oil will therefore be forced to pass through the two screens 26 and 28 and into the corrugations of the spacing member 30. The oil will then flow upward into the space between the retaining plates 42 and 48 and upward into the neck 54, then into the chamber 22, the passage 20, and then flow out at the outlet 18.

In Figure 3 the adaptation of the filter to an internal combustion engine is shown. The engine is indicated as a whole at 82 and has the crankshaft 84 mounted in bearings 86. The lower part of the engine is closed by the oil pan 88. The usual pump is indicated at 90 and this pump is equipped with a screen 92 through which the oil in the oil pan 88 is withdrawn. From the pump 90 the oil is forced through the pipes 94, 96 and 98 to the oil filtering element 2. From the filter 2 the oil passes through the pipes 100 and 102 to an oil manifold 104 which delivers the oil to the bearings 86.

While the filter is capable of taking all of the oil delivered by the pump 90, nevertheless it is believed desirable to supply a bypass valve to avoid a lack of flow of lubricant to the bearing parts when the filter is plugged or clogged. Accordingly, a T-fitting 105 is placed between the pipes 96 and 98 and in the T-fitting 105 a spring pressed ball check valve 106 is applied. The fitting 105 is connected by pipe 108 with a second T-fitting 110 provided between the pipes 100 and 102. In case the filter 2 should be plugged, the pressure of the oil will unseat the valve 106 to enable the oil to flow through the pipe 108 and into the oil manifold 104.

Referring to the species of Figure 4, the lower housing is indicated at 4 and the closure cap at 6'. The cap has the groove 8 and the gasket 10, and the housing has the lower conical shape 12. In the cap 6' there are the inlet 16, outlet 18, and outlet pipe 20, the same as in Figure 1. The filter element 24' has the inner screen 26 and the outer screen 28 which are concentric and spaced from each other and have the intermediate fluted or corrugated member 30 therebetween.

The space between the screens at the lower end is closed by the ring 32' which is channel-shaped in cross section and is soldered to the inner and outer screens at the flanges of the channel.

The upper end of the screens 26 and 28 is open and there is provided the retaining plate 42 with the edge flange 44, this plate being provided with the strengthening ribs 46.

Similarly, a reinforcing plate 48 is fitted over the outer screen 28 and secured to the outer screen by means of the peripheral edge flange 50. Suitable strengthening ribs 52 are provided in the plate 48 and the neck 54 at the top of the plate 48 fits into the mouth of the outlet passage in the cap 6'.

A strengthening member 60 is also provided and is in all respects similar to the strengthening member 60 shown in Figure 1.

The bottom of the filtering element 24' is open and does not have the intermediate part having the reinforcement ribs 38. The reason for omitting the structure is that the filter is better able to discharge the collected impurities toward the bottom of the sump 14.

The housing 4 at the bottom of the sump has the opening 66 in which the stud 68 is received, there being a gasket 70 interpositioned between the shoulder on the stud and the bottom of the conical part 12.

Instead of the bolt 72 of Figure 1, a different form of bolt 72' is provided. This bolt has the lower threaded end 72a which is screwed into the threaded bore of the stud 68. The upper end of the bolt 72' has an enlarged bored head 72b. This bore is threaded and there is screwed therein into the threaded end of a machine bolt 80' which passes through an opening 112 in the cap 6'. The head 114 of the bolt is outside the cap 6' and a gasket 116 between the head of the bolt and the cap 6' makes a liquid tight connection. By tightening the head 114 and the stud 68, the cap 6' and the housing 4 will be drawn together in liquid tight relation.

A coil spring S is positioned between the plate 42 and the bottom of the sump 14 and always urges the plate 42 upward toward the cap 6'.

The passage of the oil through the filter of Figure 4 is indicated by the arrows. The oil will enter at the inlet 16 and surround the outer screen and penetrate in the space within the inner screen. The oil will pass through the screens and into the channels in the fluted member 30. From the fluted member 30 the oil will pass forward into the passage between the parts 42 and 48 and then into the outlet passage 20.

I claim:

1. In a filter having an inlet, a housing and a cap closing said housing, a filtering element in the housing, said element comprising spaced coaxial screens and a separator between the screens, means to close the space between said screens at one end, the liquid from the inlet filling the space around the screens and passing through the screens in the filtering process, a closure member at the open end of the inner screen, a closure member at the open end of the outer screen, said closure members forming a passage therebetween to enable the outflow of filtered oil, and an outlet passage in said cap to receive the filtered substance from the said passage.

2. In a filter, a housing and a cap for closing said housing, an oil inlet and an oil outlet in the cap, a filtering element in the housing, said filtering element comprising spaced coaxial screens, a retaining plate closing the space between the screens at one end, said plate having openings to enable the liquid to be filtered to enter the space within the inner screen, the liquid from the inlet filling the space around the screens and passing through the screens in the filtering process, a second retaining plate secured to the inner screen at the opposite end thereof and closing the end of the screen, a third retaining plate secured to the outlet and to the outer screen and over the second retaining plate and spaced therefrom, the space between said plates forming a passage to enable the filtered oil to flow to the outlet.

3. In a filter, a housing and a cap closing said housing, an oil inlet and an oil outlet in said cap, a filtering element in said housing, said element comprising a retaining plate at the bottom of the element, said plate having a peripheral groove, two spaced coaxial screens, one end of said screens mounted in said groove and secured to the sides thereof, said plate having openings to enable the entrance of oil to the inside of the inner screen, a spacer between said screens, the liquid from the inlet filling the space around the screens and passing through the screens in the filtering process, a second retaining plate secured to the outlet and to the other end of the inner screen, a third retaining plate secured to the outer screen adjacent the second plate and spaced therefrom, said second and third plates forming therebetween a passage to enable the filtered liquid to flow to the outlet, and means to mount the filter in the housing.

4. In a filter, a housing and a cap closing said housing, an oil inlet and an oil outlet in the cap, a filtering element in the housing comprising a retaining plate at one end of the element, a groove in the periphery of the plate, two spaced coaxial screens having one end mounted in the groove, means in the plate to enable the access of oil to the interior of the inner screen, a second retaining plate mounted at the other end of the inner screen and secured thereto and closing the end of the screen to the passage of liquid, a third retaining plate secured to the outer screen at the upper end of the filtering element and preventing the entrance of liquid between the screens, a projecting neck on said third plate forming an oil exit and extending into the outlet in the cap in liquid tight relation, the space between the second and third retaining plates forming a passage to enable the filtering liquid to flow to the outlet in the cap.

5. In a filter, a housing and a cap closing said housing, an oil inlet and an oil outlet in the cap, a filtering element in the housing comprising a retaining plate at one end of the element, a groove in the periphery of the plate, two spaced coaxial screens having one end mounted in the groove, means in the plate to enable the access of oil to the interior of the inner screen, a second retaining plate mounted at the other end of the inner screen and secured thereto and closing the end of the screen to the passage of liquid, a third retaining plate spaced from the second plate and secured to the outer screen of the filtering element and preventing the entrance of liquid between the screens, a projecting neck on said third plate forming an oil exit and extending into the outlet in the cap in liquid tight relation, the space between the second and third retaining plates forming a passage to enable the filtered oil to flow to the outlet in the cap, and a strengthening member secured at the projecting neck and extending downwardly to the second retaining plate and reinforcing the second and third plates to prevent the pressure of the liquid from collapsing the two plates.

6. In a filter, a housing and a cap for closing said housing, an oil inlet and an oil outlet in the cap, a filtering element in the housing comprising a retaining plate at one end of the element, a groove in the periphery of the plate, two spaced coaxial screens having one end mounted in the groove, means in the plate to enable the access of oil to the interior of the inner screen, a second retaining plate mounted at the other end of the inner screen and secured thereto and closing the end of the screen to the passage of liquid, a third retaining plate spaced from the second plate and secured to the outer screen at the upper end of the filtering element and preventing the entrance of liquid between the screens, a projecting neck on said third plate forming an oil exit and extending into the cap in liquid tight relation, the space between the second and third retaining plates forming a passage to enable the filtering liquid to flow to the outlet in the cap, said first and second plates having central openings on the same axis, a stud, and a bolt passing through the plates and tightly interfitting therewith and being secured to the stud and capable tightly to hold the cap on the housing and to retain the filtering element in the housing.

7. In a filter, a housing and a cap closing said housing, an inlet passage and an outlet passage in said cap, a filtering element in the housing, said element comprising spaced coaxial screens and a separator between the screens, a ring U-shaped in cross section for closing the space between said screens at one end, said screens being secured to the ring and held against the sides of the ring by the separator, the space between said screens being open at the other end, a closure member at the open end of the inner screen, the liquid from the inlet filling the space around the screens and passing through the screens in the filtering process, a closure member at the open end of the outer screen, said closure members forming a passage therebetween to enable the outflow of filtered liquid.

8. In a filter, a housing and a cap closing said housing, a filtering element in the housing, said element comprising spaced coaxial screens and a separator between the screens, an inlet to enable the liquid to be filtered to reach the outside of the screens, a ring U-shaped in cross section for closing the space between said screens at one end, said screens being secured to the ring and held against the sides of the ring by the separator, the space between said screens being open at the other end to enable the outflow of filtered liquid, a closure member at the open end of the inner screen, a closure member at the open end of the outer screen, said closure members closing the open end of the screens to the entrance of unfiltered liquid and forming a passage therebetween to enable the outflow of filtered liquid, an outlet passage in said cap, and a neck on said closure member for the outer screen projecting into said outlet passage to guide the filtered liquid to the outlet of the filter.

HERBERT G. KAMRATH.

CERTIFICATE OF CORRECTION.

Patent No. 2,301,120.   November 3, 1942.

HERBERT G. KAMRATH.

It is hereby certified that error appears in the printed specification of the above numbered patent requiring correction as follows: Page 3, first column, line 7, strike out "a spacer between said screens," and insert the same after the word and comma "process," in line 10, same claim; line 11, strike out the words "to the outlet and" and insert the same after "secured" in line 12; and that the said Letters Patent should be read with this correction therein that the same may conform to the record of the case in the Patent Office.

Signed and sealed this 29th day of December, A. D. 1942.

(Seal)

Henry Van Arsdale,
Acting Commissioner of Patents.